(12) United States Patent
Morita

(10) Patent No.: US 9,632,697 B2
(45) Date of Patent: Apr. 25, 2017

(54) INFORMATION PROCESSING APPARATUS AND CONTROL METHOD THEREOF, AND NON-TRANSITORY COMPUTER-READABLE MEDIUM

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 14/204,528

(22) Filed: Mar. 11, 2014

(65) Prior Publication Data
US 2014/0289662 A1 Sep. 25, 2014

(30) Foreign Application Priority Data
Mar. 19, 2013 (JP) ................................. 2013-057304

(51) Int. Cl.
*G06F 3/0484* (2013.01)
*G06F 3/0485* (2013.01)
(Continued)

(52) U.S. Cl.
CPC ........ *G06F 3/04883* (2013.01); *G06F 3/0485* (2013.01); *G06F 3/0486* (2013.01);
(Continued)

(58) Field of Classification Search
CPC .. G06F 3/0486; G06F 3/0485; G06F 3/04842; G06F 3/04845; G06F 3/0487; G06F 3/04883
(Continued)

(56) References Cited

U.S. PATENT DOCUMENTS 8,619,038 B2 12/2013 Chaudhri et al. ............. 345/173
2009/0271723 A1* 10/2009 Matsushima et al. ........ 715/769
(Continued)

FOREIGN PATENT DOCUMENTS

CN 101836182 9/2010
CN 102722324 10/2012
(Continued)

OTHER PUBLICATIONS

CN Office Action issued Aug. 23, 2016, in counterpart Chinese patent application 201410098501.8, with translation.
(Continued)

*Primary Examiner* — Ting Lee
(74) *Attorney, Agent, or Firm* — Fitzpatrick, Cella, Harper & Scinto

(57) ABSTRACT

An information processing apparatus comprises: a status change unit configured to change, if a drag operation required to drag an object is made by bringing an instruction member into contact with a screen which is configured to accept a multi-touch instruction, an object, for which the drag operation is made, of a first page to a drag state; a determination unit configured to determine whether or not an instruction requested by bringing the instruction member into contact with the screen during dragging of the object is a page change instruction; a page change unit configured to change, if it is determined that the instruction is the page change instruction, a display target page from the first page to a second page during dragging of the object; and an arrangement unit configured to arrange the dragged object on the second page.

9 Claims, 10 Drawing Sheets

(51) Int. Cl.
  *G06F 3/0486* (2013.01)
  *G06F 3/0488* (2013.01)
(52) U.S. Cl.
  CPC ...... *G06F 3/04842* (2013.01); *G06F 3/04845* (2013.01); *G06F 2203/04806* (2013.01); *G06F 2203/04808* (2013.01)
(58) Field of Classification Search
  USPC .......................................... 715/769; 345/173
  See application file for complete search history.

(56) References Cited

U.S. PATENT DOCUMENTS

| | | | |
|---|---|---|---|
| 2010/0017732 A1 | 1/2010 | Matsushima et al. | 715/765 |
| 2010/0053221 A1 | 3/2010 | Kaneko et al. | |
| 2011/0209057 A1 | 8/2011 | Hinckley et al. | 715/702 |
| 2012/0182234 A1* | 7/2012 | Huang et al. | 345/173 |
| 2012/0188177 A1* | 7/2012 | Kim et al. | 345/173 |
| 2013/0021273 A1 | 1/2013 | Lee et al. | |
| 2013/0076674 A1* | 3/2013 | Lee | 345/173 |
| 2013/0135228 A1* | 5/2013 | Won | G06F 3/04883 345/173 |
| 2013/0215059 A1* | 8/2013 | Lim et al. | 345/173 |

FOREIGN PATENT DOCUMENTS

| | | |
|---|---|---|
| CN | 102736826 | 10/2012 |
| JP | 2000-35842 A | 2/2000 |
| JP | 2010-086519 A | 4/2010 |

OTHER PUBLICATIONS

Japanese Office Action issued in counterpart Japanese Patent Application No. 2013057304, dated Feb. 3, 2017.

* cited by examiner

INFORMATION PROCESSING APPARATUS AND CONTROL METHOD THEREOF, AND NON-TRANSITORY COMPUTER-READABLE MEDIUM

BACKGROUND OF THE INVENTION

Field of the Invention

The present invention relates to an information processing apparatus and control method thereof, and a non-transitory computer-readable medium and, more particularly, to a control method of a drag & drop operation in a multi-touch compatible device.

Description of the Related Art

Conventionally, a mouse is popularly used as an input device to a computer. The mouse is used to execute input processing to the computer by operating a cursor and pointer in a GUI (Graphical User Interface) environment. On the other hand, an input device using a touch panel is known as an alternative of an input operation from the mouse or the like. The touch panel allows both screen display and inputs, and the user performs input processing by touching a GUI environment displayed on a screen with an instruction member such as a finger or stylus.

In addition, in recent years, a so-called multi-touch technique begins to be adopted on a touch panel of a mobile terminal such as a PDA (Personal Digital Assistant) or smartphone. A multi-touch operation is basically the same as the conventional touch panel operation. However, the multi-touch operation allows the user to intuitively call a variety of functions such as rotation and zooming of a target by touching a plurality of positions at the same time.

Also, Japanese Patent Laid-Open No. 2000-35842 describes that a dragged object is overlaid on a designated region, which is defined on a circumferential portion of a display region, thus scrolling the display region or changing a page.

However, with the technique of Japanese Patent Laid-Open No. 2000-35842, an operation load required to scroll the display region or to change a page unwantedly becomes heavier.

SUMMARY OF THE INVENTION

According to one aspect of the present invention, there is provided an information processing apparatus comprising: a status change unit configured to change, if a drag operation required to drag an object is made by bringing an instruction member into contact with a screen which is configured to accept a multi-touch instruction, an object, for which the drag operation is made, of a first page to a drag state; a determination unit configured to determine whether or not an instruction requested by bringing the instruction member into contact with the screen during dragging of the object is a page change instruction; a page change unit configured to change, if it is determined that the instruction is the page change instruction, a display target page from the first page to a second page during dragging of the object; and an arrangement unit configured to arrange the dragged object on the second page.

According to another aspect of the present invention, there is provided a control method of an information processing apparatus, comprising: a status change step of changing, if a drag operation required to drag an object is made by bringing an instruction member into contact with a screen which is configured to accept a multi-touch instruction, an object, for which the drag operation is made, of a first page to a drag state; a determination step of determine whether or not an instruction requested by bringing the instruction member into contact with the screen during dragging of the object is a page change instruction; a page change step of changing, if it is determined that the instruction is the page change instruction, a display target page from the first page to a second page during dragging of the object; and an arrangement step of arranging the dragged object on the second page.

According to another aspect of the present invention, there is provided a non-transitory computer-readable medium storing a program for controlling a computer to function as: a status change unit configured to change, when a drag operation required to drag an object is made by bringing an instruction member into contact with a screen which is configured to accept a multi-touch instruction, an object, for which the drag operation is made, of a first page to a drag state; a determination unit configured to determine whether or not an instruction requested by bringing the instruction member into contact with the screen during dragging of the object is a page change instruction; a page change unit configured to change, when it is determined that the instruction is the page change instruction, a display target page from the first page to a second page during dragging of the object; and an arrangement unit configured to arrange the dragged object on the second page.

According to the present invention, if the user moves an object, an interactive operation such as scrolling of a screen or page movement is efficiently performed, thus improving the operability.

Further features of the present invention will become apparent from the following description of exemplary embodiments (with reference to the attached drawings).

DESCRIPTION OF THE EMBODIMENTS

Embodiments of the present invention will be described hereinafter with reference to the drawings.

[System Arrangement]

Figure 1:
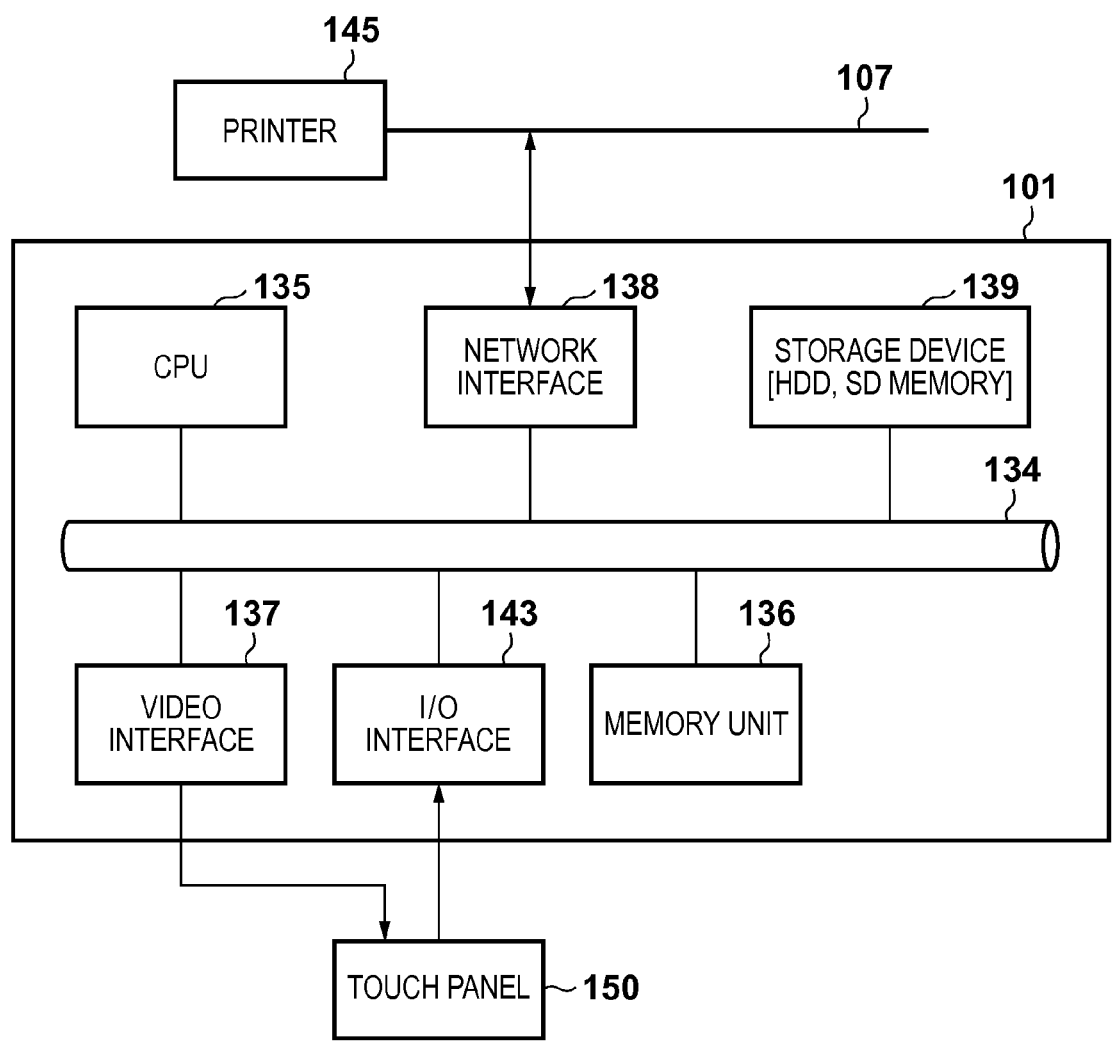
FIG. 1 is a block diagram showing an example of the arrangement of a system according to the present invention.

FIG. 1 is a block diagram showing an example of the hardware arrangement of a system including an information processing apparatus according to the present invention. An information processing apparatus 101 is connected to a touch panel 150 as a multi-touch compatible input/output unit. Note that the input device may be replaced by an input unit such as a touch pad which allows multi-touch inputs.

Also, in addition to or in place of the touch panel 150, a projector or display device may be connected as an output device.

The information processing apparatus 101 typically includes at least one processor unit (CPU) 135 and memory unit 136. The memory unit 136 is configured by, for example, a RAM (Random Access Memory) and ROM (Read Only Memory) as semiconductor memories. Furthermore, the information processing apparatus 101 includes, for example, a video interface 137 and I/O interface 143 required for input/output control with the touch panel 150. A storage device 139 typically includes a hard disk drive (HDD) or SD memory. Although not shown in FIG. 1, the storage device may include an SSD, compact Flash® memory, Floppy® disk drive, magnetic tape drive, or the like. The information processing apparatus 101 uses the I/O interface 143 from an OS (Operating System) such as iOS available from Apple inc. or Android available from Google Inc., or components of the information processing apparatus 101 which make communications via a connection bus 134.

A control mechanism required to implement the sequences shown in the flowcharts of the present invention is stored in, for example, a computer-readable medium including the storage device 139. Software is read out from the computer-readable medium, and is executed by the CPU 135 of the information processing apparatus 101.

A network interface 138 connects the information processing apparatus 101 to a network 107 to allow it to communicate with other information apparatuses. The network 107 corresponds to, for example, a LAN (Local Area Network), WAN (Wide Area Network), or the like. The network 107 can be either a wired or wireless network. Also, the network interface 138 can detect a printer 145 on the network 107, and can communicate with the printer 145.

Also, the present specification will explain a drag & drop operation on the touch panel 150 as an embodiment. However, if an input/output environment using a touch pad and display device can establish an equivalent environment, these devices may be used. Assume that the touch panel 150 in the present specification indicates a capacitance type touch panel which detects a position by detecting a change in capacitance between the finger tip and a conductive film, and configures a multi-touch screen including a multi-touch function which can detect a plurality of positions. However, touch panels of other types may be used. Note that the multi-touch function capable of detecting a plurality of fingers (instruction members) is a state-of-the-art technique, and a detailed description thereof will not be given.

First Embodiment

Figure 2:
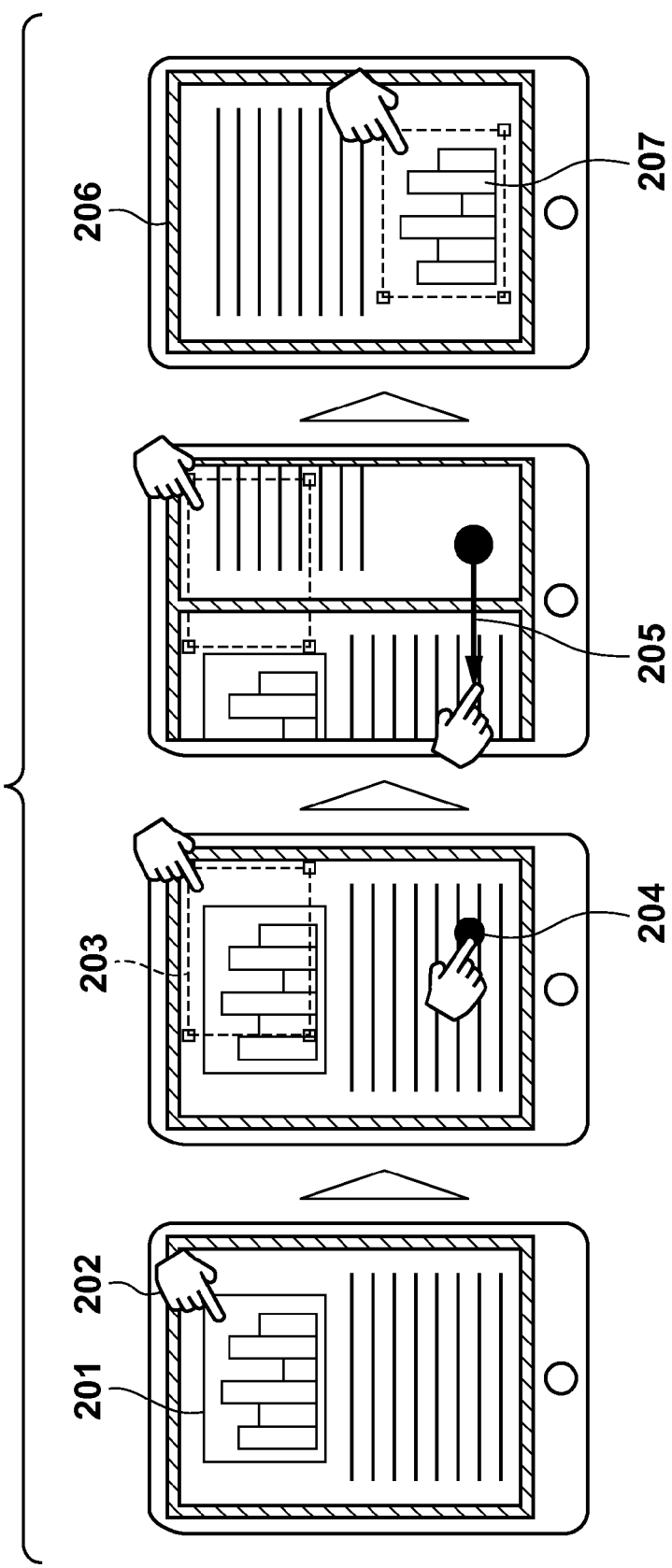
FIG. 2 is a view for explaining an overview of operations according to the present invention.

An overview of drag & drop processing according to this embodiment will be described below with reference to FIG. 2. FIG. 2 shows an example in which a portable terminal corresponding to the information processing apparatus 101 loads data of a digital document, and one page of the digital document is displayed on a multi-touch compatible display unit (touch panel 150). A case will be exemplified below wherein an object 201 arranged on a certain page is moved to an empty region in the next page. In this case, the user selects the object 201 by a first input (drag operation) 202 to start dragging of the object 201 in the same manner as in the conventional drag & drop operation. An object 203 indicates that the object 201 is in a drag state (selected state).

In this embodiment, a second input (swipe or flick operation) 205 is accepted at a position 204 in addition to the first input 202. At this time, assume that the object 201 maintains the drag state by the first input 202. By making the second input 205 on the screen, a page transition (slide) is made while maintaining the drag state of the object 201, thus displaying a next page 206. After the next page 206 is displayed, the user makes a drop operation of the object 201 in the selected state onto the empty region in a lower portion of the page. According to this drop operation, movement of the object is settled like an object 207 in the empty region in the display. With the above operations, the object is moved to the next page. Note that in the series of operations, the object may be copied in place of being moved.

[Processing Sequence]

Figure 3:
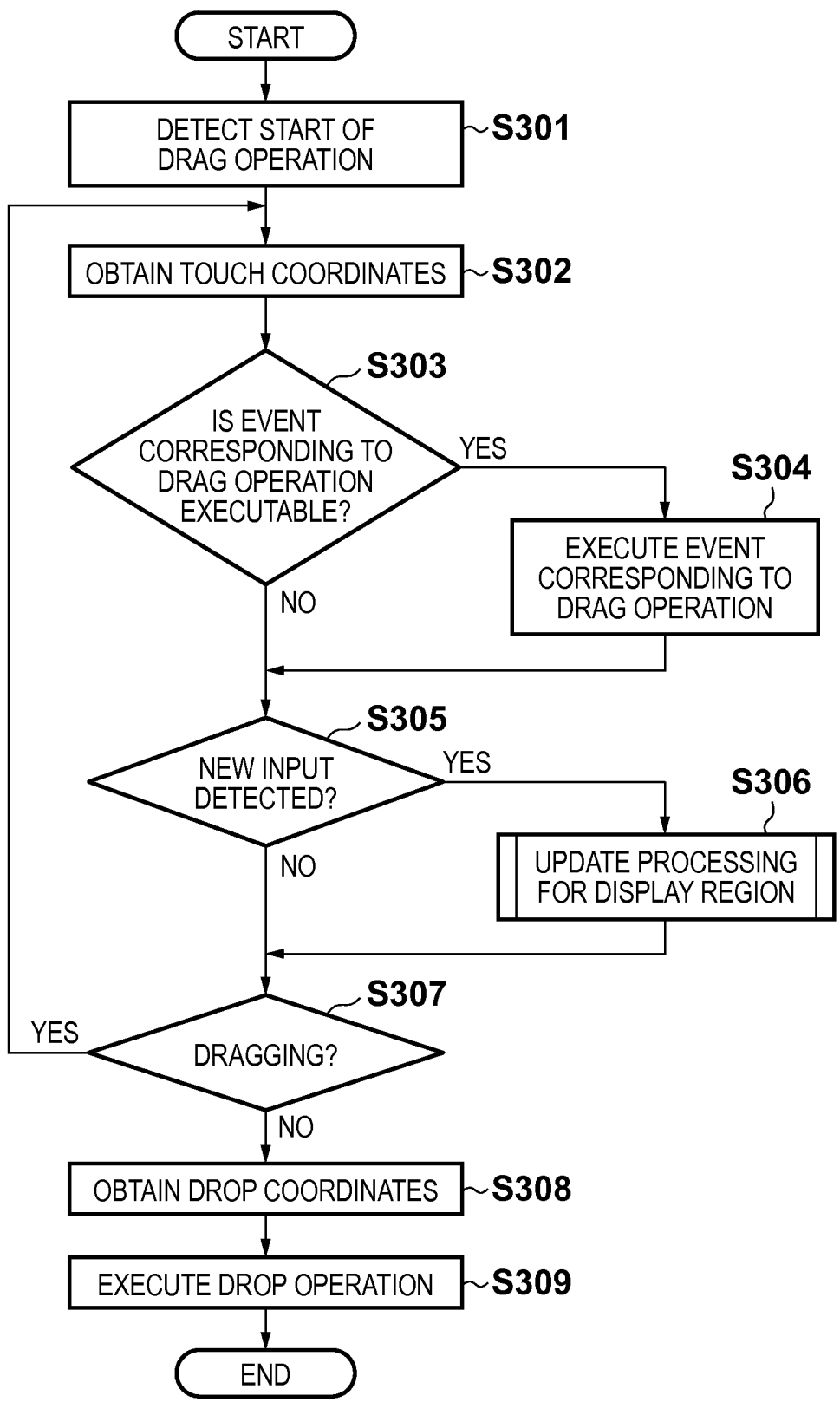
FIG. 3 is a flowchart of processing according to the first embodiment.

FIG. 3 is a flowchart showing processing according to the embodiment of the present invention. FIG. 2 will be used as a material for a supplemental explanation. In this embodiment, assume that the processing sequence of the present application is implemented if the CPU of the information processing apparatus 101 reads out and executes a program stored in the memory unit 136 as a storage unit.

In step S301, the information processing apparatus 101 detects start of a drag operation for an object based on information (first input) input to the touch panel 150. In this case, the information processing apparatus 101 obtains information required to move a drag target (object) and that required to draw the object. The information required to move the object indicates that which can uniquely specify the object (for example, index information of the move source object, a range of the object, and the like which are used in a drop operation).

In step S302, the information processing apparatus 101 obtains touch coordinates. The touch coordinates at this time correspond to the start position of the drag operation indicated by the first input 202 in FIG. 2, and are obtained from an event notified from the OS or the like.

The information processing apparatus 101 determines in step S303 based on the touch coordinates obtained in step S302 whether or not an event corresponding to the drag operation is executable. The event in this case indicates drawing processing generated if the object is dragged, additionally generated processing, and the like. The drawing processing includes change processing of a cursor (an effect displayed as touch points during dragging), display processing of a circumscribed rectangle of the dragged object, and display update processing of an effect and marker indicating a region to be dropped. The additionally generated processing indicates, for example, display region move processing if the cursor is placed on the circumferential portion of the display region in the touch panel 150.

If an event corresponding to the drag operation is executable (YES in step S303), the information processing apparatus 101 executes the corresponding display update processing and additionally generated processing in step S304. Note that the display region move processing such as auto-scroll processing of the screen if the cursor is placed at the screen end of the touch panel 150 is a state-of-the-art technique, and a detailed description thereof will not be given.

The information processing apparatus 101 determines in step S305 whether or not a second input is detected by the touch panel 150. The second input indicates that a position different from the first input is touched on the touch panel 150 to detect a multi-touch operation. This corresponds to the second input 205 in FIG. 2. If the second input is detected (YES in step S305), the process advances to step S306. If the second input is not detected (NO in step S305), the process advances to step S307.

In step S306, the information processing apparatus 101 executes update processing for the display region (display contents). In this step, screen scroll processing generated during dragging of the object and screen switch processing upon page movement are executed. Details of this processing will be described later with reference to FIG. 4. After that, the process advances to step S307.

The information processing apparatus 101 determines in step S307 whether or not dragging of the object is underway. If dragging of the object is underway (YES in step S307), the process returns to step S302, and the information processing apparatus 101 continues the drag processing. If dragging of the object is not underway, that is, if a drop instruction is issued to the dragged object (NO in step S307), the process advances to step S308.

In step S308, the information processing apparatus 101 obtains coordinates of a position where the object is dropped. Then, in step S309, the information processing apparatus 101 moves the object to the drop instructed position.

(Update Processing)

Figure 4:
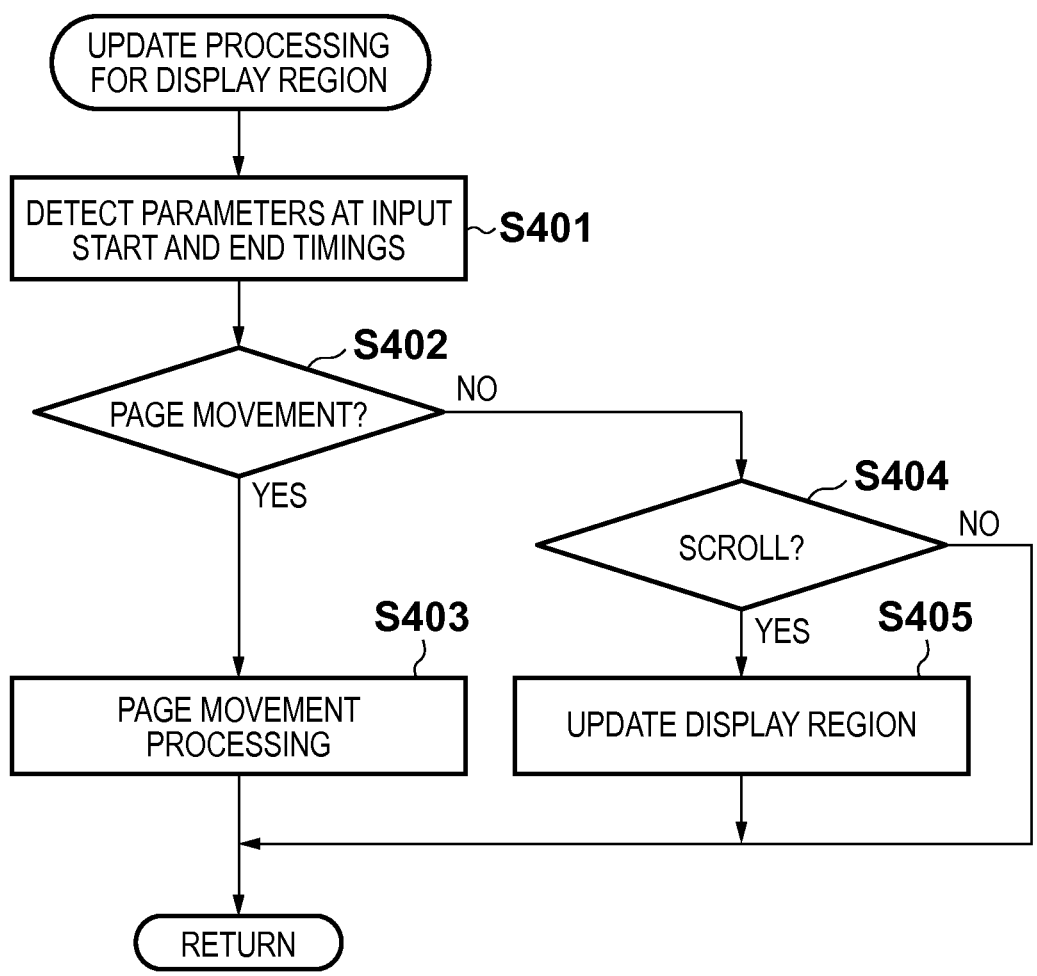
FIG. 4 is a flowchart of processing for a display region.

FIG. 4 is a flowchart showing the processing if the information processing apparatus 101 executes the update processing (screen scroll processing or screen switching processing upon page movement during dragging) for the display region (display contents).

In step S401, the information processing apparatus 101 obtains parameters for the second input. Note that the parameters indicate values which can be obtained by reading start and end coordinates of the input. More specifically, the parameters include the start and end coordinates, a moving distance, a moving direction, a time required for movement, and the like of the second input. These parameters are stored in the memory unit 136, and are used in the subsequent processes.

The information processing apparatus 101 determines in step S402 based on the parameters obtained in step S401 whether or not the update processing for the display region is page movement. For example, if the user makes a leftward flick operation while one page is displayed on the full screen (if the coordinates of an end point are located on the left side of a start point in the second input), it is determined that a move instruction from the current page to another page (a page located on the right side) is input. Note that in case of a UI under the condition that pages are vertically arranged, a page is moved by an upward or downward flick operation. Hence, the page movement method follows the display format of the system. Since details of the page movement method is a state-of-the-art technique, a description thereof will not be given.

If it is determined that the update processing for the display region is page movement (YES in step S402), the process advances to page movement processing (step S403). Since the page movement processing is the same as known general page movement, a description thereof will not be given.

If the update processing for the display region is not page movement (NO in step S402), the process advances to step S404. The information processing apparatus 101 determines in step S404 whether or not the screen is scrollable. A scrollable state of the screen indicates a state in which one page is displayed in an enlarged scale and does not fall within the screen, and contents in the page which are displayable in the instructed moving direction still remain. That is, the scrollable state indicates a state in which a page end of the page is not displayed in a direction designated by the user.

If the screen is scrollable (YES in step S404), the process advances to step S405. In step S405, the information processing apparatus 101 updates the display region. In this case, the display scrolling (moving) amount may be changed according to the start and end points of a touch in practice, or may be calculated by applying an acceleration according to a touch moving speed. If the screen is not scrollable (NO in step S404), this processing sequence ends.

For example, according to this embodiment, the user can move a page with the index finger of the left hand while selecting and dragging an object with the index finger of the right hand. Then, the user can drop the object after movement to a desired page.

As described above, interactive operations such as scrolling of the screen and page movement upon dragging & dropping an object are made more efficiently, thus improving the operability.

Second Embodiment

The first embodiment has explained movement of an object across pages. However, a drop operation cannot often be made on a move destination page (or, for example, a layout may be broken to cause inconvenience) due to parameters and a status of an object. For example, in case of a page 501 in FIG. 5, since a dragged object 502 is too large to be moved, it cannot fall within an empty region in a move destination page without changing an object size.

This embodiment solves the above problem by changing a status (parameters) of an object during dragging. This embodiment will exemplify processing for changing an object size.

Figure 5:
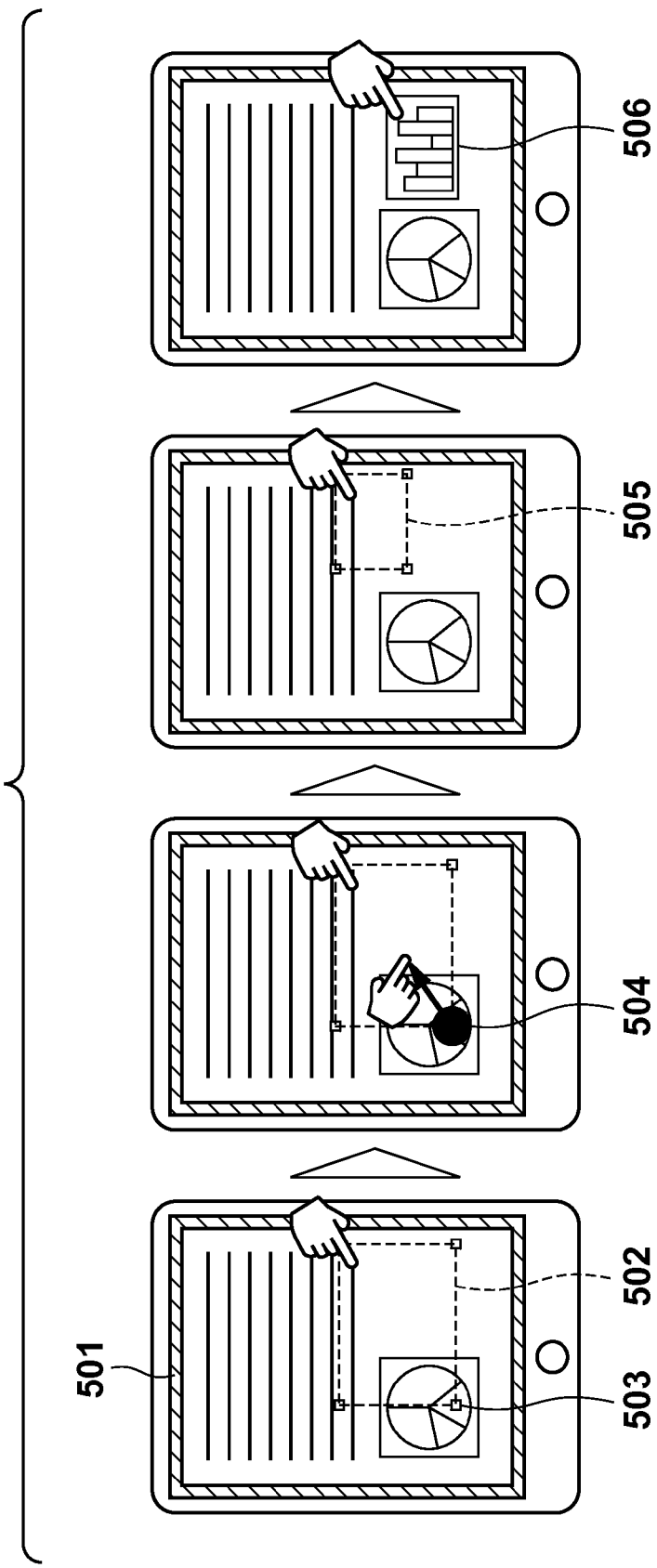
FIG. 5 is a view for explaining an operation for changing a size of a dragged object.

An overview of the operations will be explained first taking FIG. 5 as an example. On the dragged object 502, edit handles 503 used to change an object size are displayed. The user operates an edit handle 503 during dragging of an object (input 504) to change the size of the object 502 to that indicated by an object 505. Then, the object 505 is arranged in an empty region in a page after movement (after scrolling) by a drop operation onto the target region. This result is shown as an object 506. With the above operations, the user can make a drag & drop operation while changing parameters of an object.

[Processing Sequence]

Figure 6:
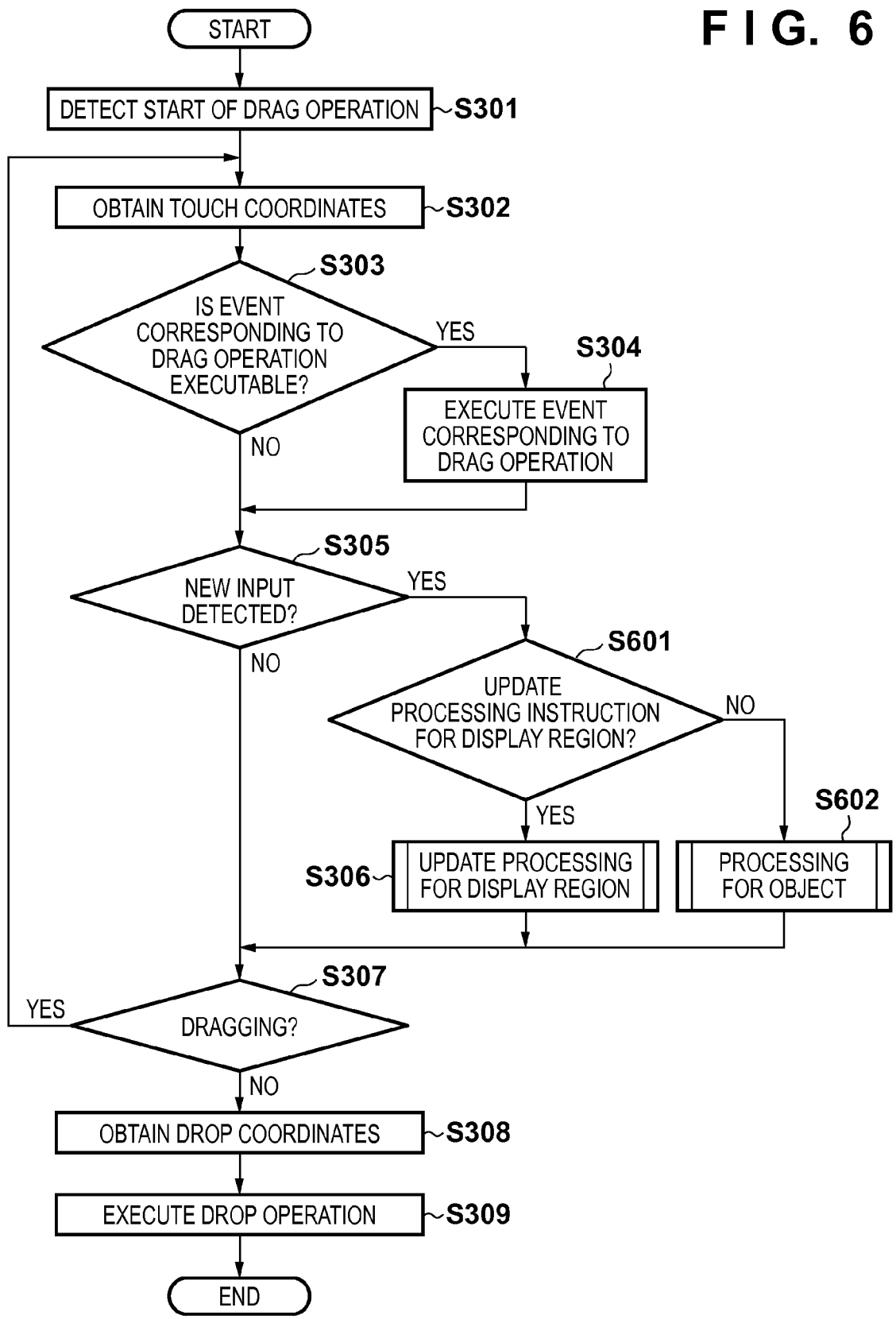
FIG. 6 is a flowchart of processing for changing a size of a dragged object.

FIG. 6 is a flowchart related to the aforementioned processing. In the flowchart of FIG. 6, determination processing (step S601) for determining processing for a display region or that for an object and processing (step S602) for an object are added to the flowchart shown in FIG. 3 of the first embodiment. These additional steps will be explained below. Note that the same step numbers denote the same processes as in FIG. 3, and a description thereof will not be repeated.

If a second input is detected in step S305 (YES in step S305), an information processing apparatus 101 determines in step S601 whether the second input is an update processing instruction for the display region or a processing instruction for an object. An overview about the determination method in this step will be described below with reference to FIG. 7.

An object 701 indicates a dragged object. Edit handles 702 are used to edit the object 701. If the user touches one of the edit handles 702 and makes a drag operation, he or she can enlarge or reduce the size of the object 701. In this embodiment, the object 701 is enlarged or reduced according to a difference of a distance from an edit start point to an end point upon touching the edit handle 702. A touch point 703 is a point touched to drag the object 701 as a first input. An input 704 is the second input, a position 705 represents an input start point, and a position 706 represents an input end point. In this case, the input 704 expresses that the user makes an operation for flicking leftward over a distance from the position 705 to the position 706 (flick operation).

Figure 7:
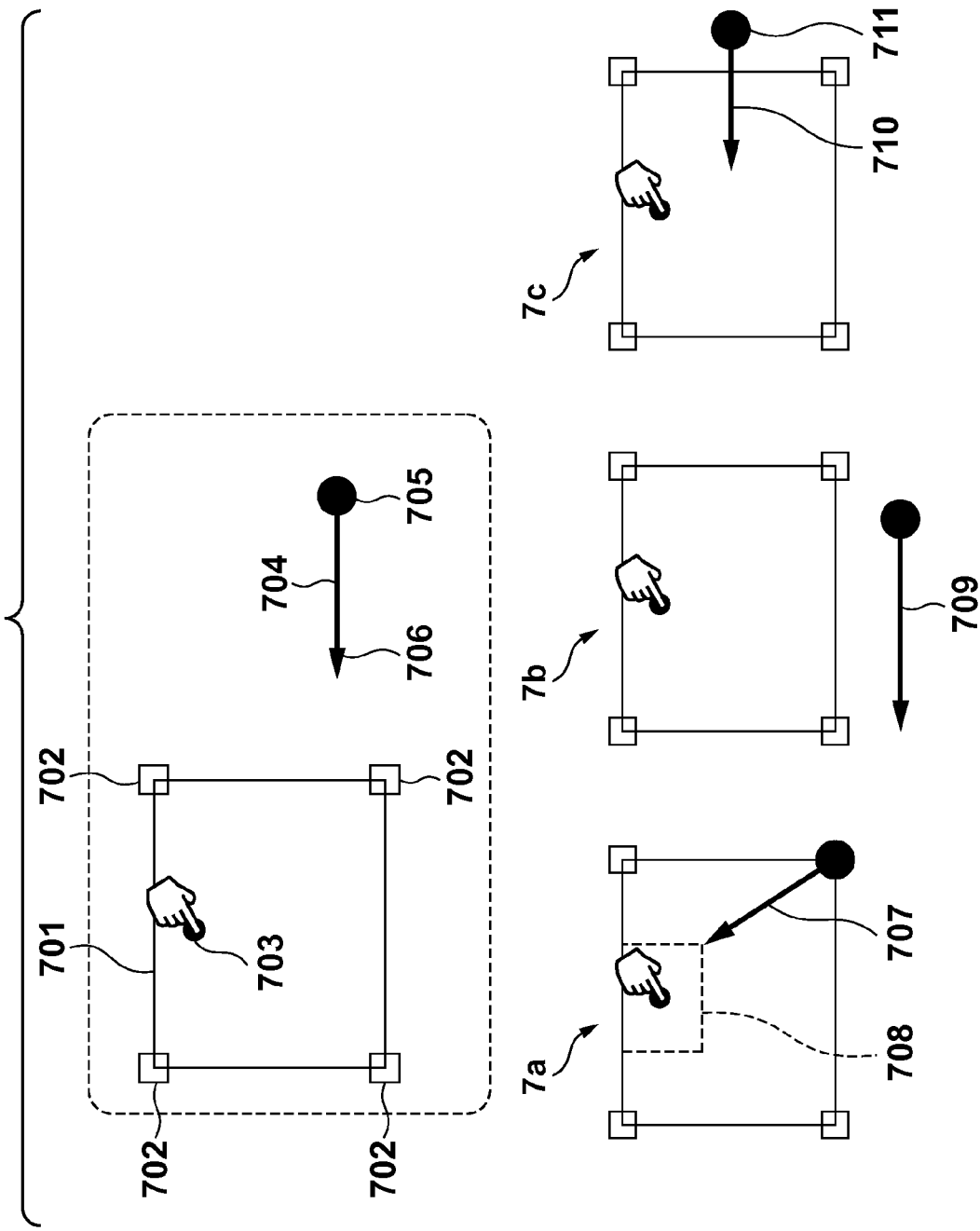
FIG. 7 is a view for explaining determination for an input.

7a in FIG. 7 shows an example of an edit operation of an object by an input 707. 7b and 7c in FIG. 7 show examples of update processing for the display region by inputs 709 and 710. In 7a in FIG. 7, the input 707 corresponds to processing which is started while touching the edit handle 702 of an object, so as to reduce the object to a size indicated by a broken line 708. Therefore, an input corresponding to this input 707 is determined as processing for an object (NO in step S601), and the process advances to step S602.

In 7b in FIG. 7, the input 709 does not instruct any dragged object. That is, both of the start and end points of the input 709 are not included in an object region. An input corresponding to this input 709 is determined as processing for the display region (YES in step S601), and the process advances to step S306.

In 7c in FIG. 7, an end point of the input 710 instructs a dragged object, but a start point 711 does not instruct any object. That is, the start point 711 of the input 710 is not included in a region of a dragged object, and the end point alone is included in the region of the object. An input corresponding to this input 710 is determined as update processing for the display region (YES in step S601), and the process advances to step S306.

Note that even if an input is determined as a processing instruction for an object, if parameters of the object are not changed by that processing or no corresponding processing is executed, processing may be executed while being switched as that for the display region.

(Processing for Object)

Figure 8:
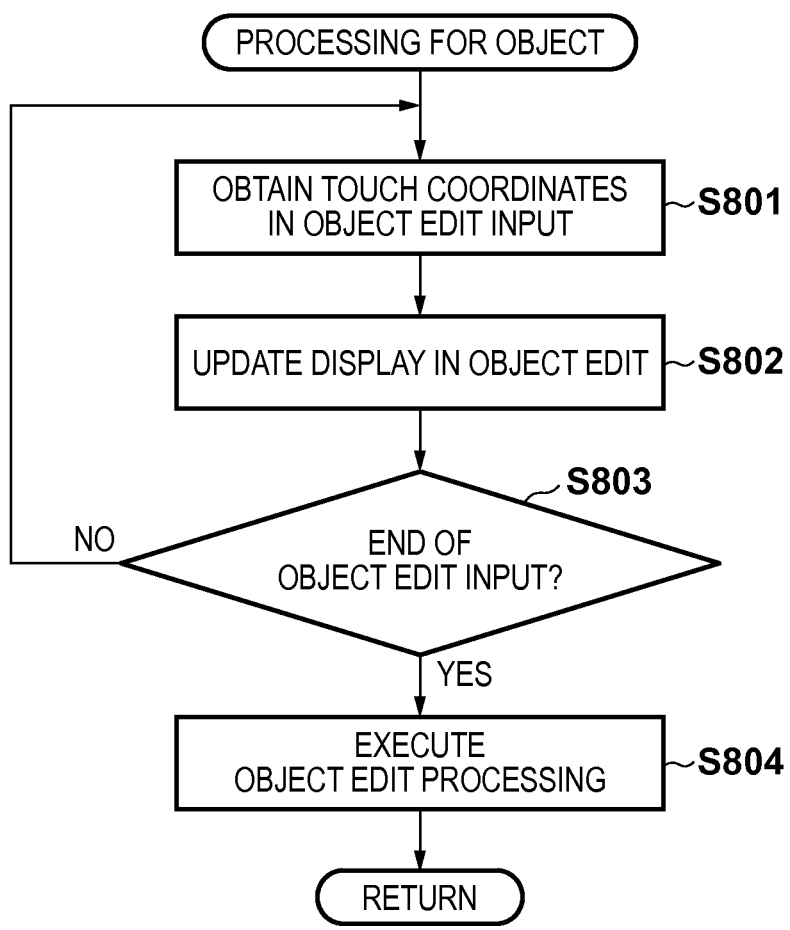
FIG. 8 is a flowchart of processing for an object.

FIG. 8 is a flowchart showing the processing for an object of the information processing apparatus 101. Steps S801 to S803 correspond to display update processing until an object edit input is settled. During this processing, a dragged object is displayed, as indicated by the broken line 708 in 7a in FIG. 7.

In step S801, the information processing apparatus 101 obtains touch coordinates in an object edit input. Note that in a multi-touch event, two sets of coordinates (start coordinates of an object edit input and coordinates at that timing) can be obtained. For example, in the arrangement which can obtain an input as an array, let Event.Touch[0] (coordinates are defined by (Event.Touch[0].X, Event.Touch[0].Y)) be an input corresponding to the start coordinates. Also, Event. Touch[1] is handled as an input corresponding to coordinates at that timing.

In step S802, the information processing apparatus 101 calculates a size of the dragged object based on information of the obtained coordinates to execute display update processing of the object.

The information processing apparatus 101 determines in step S803 whether or not the object edit input ends. If the object edit input ends (YES in step S803), the process advances to step S804. If the object edit input does not end (NO in step S803), the process returns to step S801, and the information processing apparatus 101 continues to edit the object.

In step S804, the information processing apparatus 101 executes an edit operation (in this case, an enlargement/ reduction operation of the object) of the object based on a relative distance between the input start coordinates and final end coordinates. Then, this processing sequence ends. As described above, the processing for the dragged object is executed.

In addition to the effects of the first embodiment, an edit operation can be performed for a dragged object, thus improving the operability of the user.

Third Embodiment

In the processing of the second embodiment, an object is edited (a size is changed in the above example) by another input during dragging of the object. On the other hand, depending on a size of a dragged object, an edit handle is occluded by the finger or the like to disturb an edit operation. An example of a problem to be handled in this embodiment will be described below with reference to FIG. 9.

Figure 9:
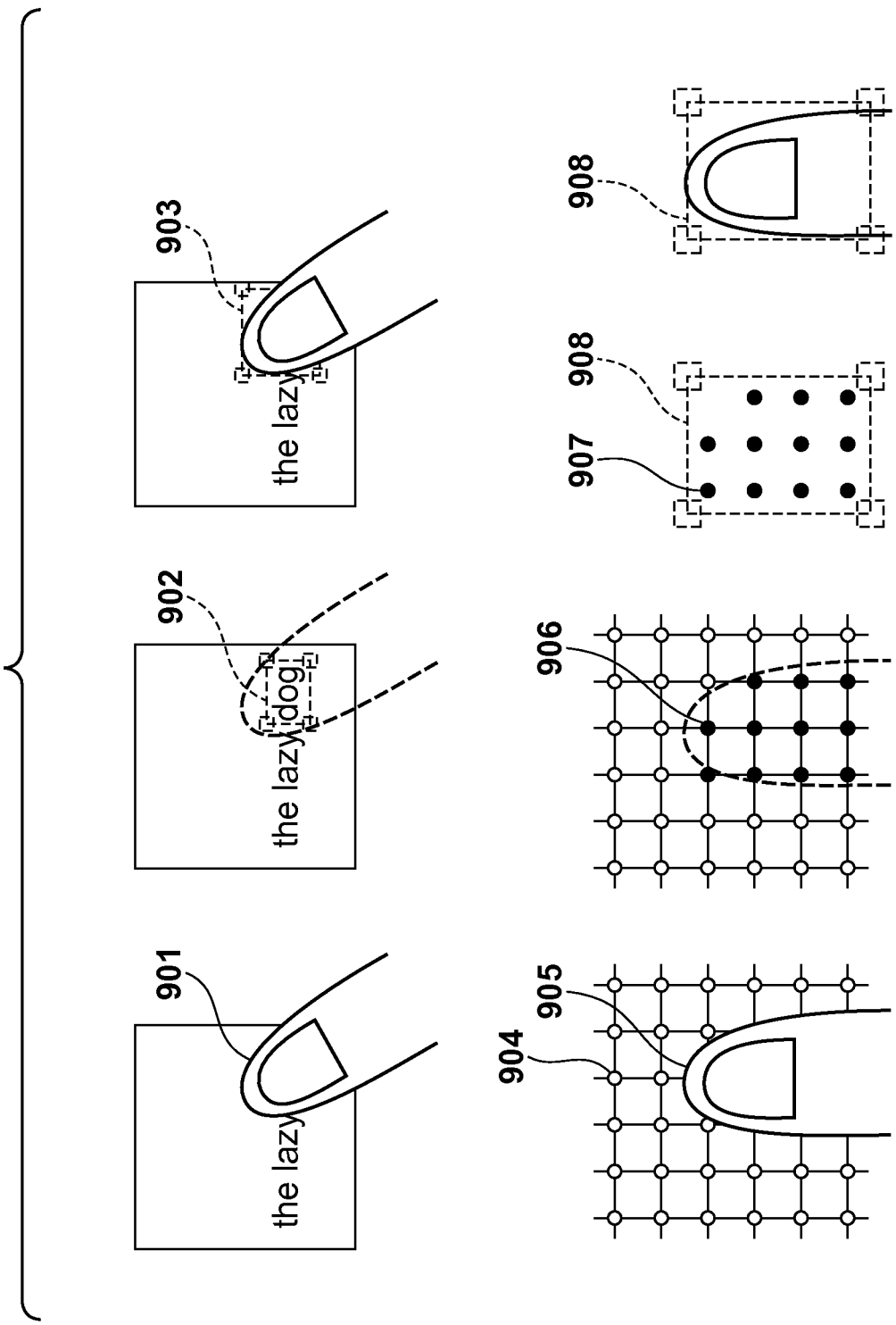
FIG. 9 is a view for explaining re-setting processing of a circumscribed rectangle size of a dragged object.

In FIG. 9, if an object is instructed with a finger 901, since a display size of the dragged object is smaller than the finger 901, a circumscribed rectangle and edit handles 902 of the object are occluded. In this case, the user cannot instruct the edit handle 902 of the dragged object, thus impairing the operability. Thus, in this embodiment, if a dragged object is smaller than an instruction member such as the finger, a circumscribed rectangle and edit handles of the dragged object are displayed to be larger than the finger (903), thus improving the operability.

[Processing Sequence]

Figure 10:
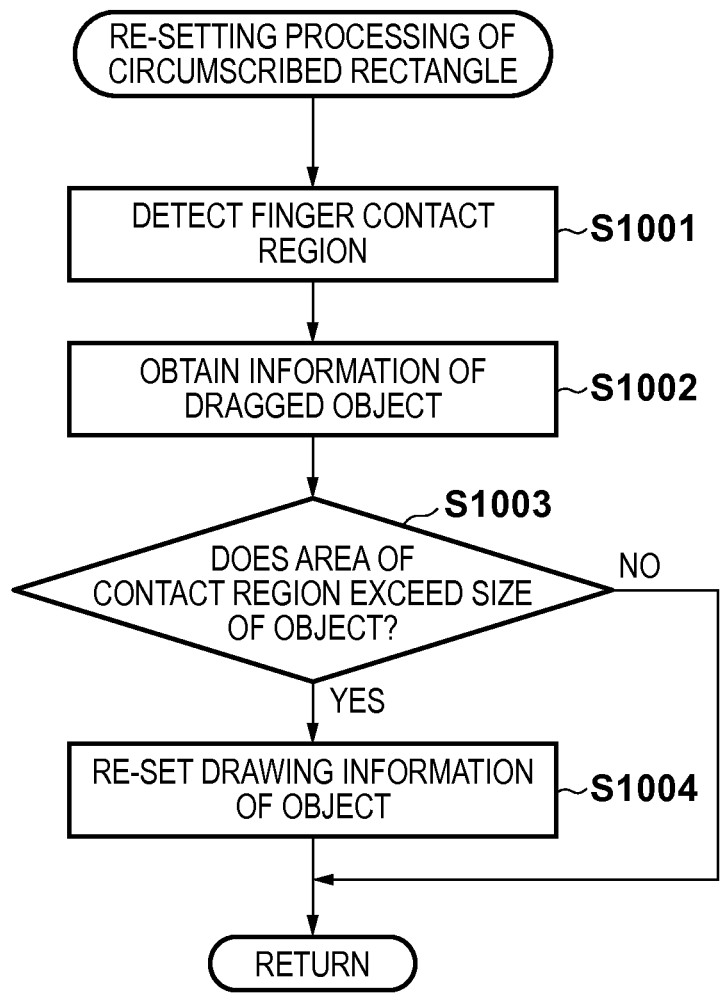
FIG. 10 is a flowchart of the re-setting processing of a circumscribed rectangle size of a dragged object.

The processing sequence shown in FIG. 10 indicates processing executed if the information processing apparatus 101 recalculates sizes of a circumscribed rectangle and edit handles of an object and re-draws them as needed. Assume that this processing is executed immediately after touch coordinates are obtained (step S302) in FIG. 3. Note that this embodiment uses the capacitance type touch detection mechanism. However, if an equivalent environment can be established based on pressure detection or information of physical vibrations, sounds, light rays, and the like (for example, ultrasonic waves), it may be used instead.

In step S1001, the information processing apparatus 101 obtains position information and a contact area of a finger (instruction member) which contacts the touch panel 150. In the example of FIG. 9, a plurality of electrodes 904 are present on the surface of the touch panel 150. In this embodiment, assume that the information processing apparatus 101 can obtain information as to contacts from all electrodes. If the finger 905 contacts the touch panel 150, the information processing apparatus 101 obtains information of a list or region of contact points 906. In this case, contact points indicate those displayed in black like, for example, the points 906 in FIG. 9.

In step S1002, the information processing apparatus 101 obtains information of a dragged object. In this embodiment, the information processing apparatus 101 obtains position information of the dragged object, and information (size information and the like) used in drawing such as a circumscribed rectangle of the object.

In step S1003, the information processing apparatus 101 compares the size of the contact region detected in step S1001 and that of the dragged object to determine which size is larger. If the detected region exceeds the object size like the finger 901 in FIG. 9 (YES in step S1003), the process advances to step S1004; otherwise (NO in step S1003), this processing sequence ends. Note that it may be determined in this determination step that the contact region exceeds the size if the size of the detected contact region overlaps the object at a predetermined ratio or higher.

In step S1004, the information processing apparatus 101 recalculates drawing information (size of a circumscribed rectangle) of the dragged object. In this case, a circumscribed rectangle 908, which has a given margin by obtaining coordinates of upper, lower, right, and left ends from the list of the points 907 included in the contact region detected in step S1001, is used as a size to be re-set. As a result, a rectangle 903 is displayed to control its display size. The margin in this case is set in consideration of the fact that an actual size of the finger is larger than a contact area. Note that the margin may be manually set by the user, may be set in advance in the system, or may be dynamically set.

As described above, even if a display size of a dragged object is small, and the object is occluded if it is dragged with the finger or the like, the circumscribed rectangle 908 larger than the finger can be drawn. As a result, the visibility can be improved in addition to the effects of the first embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-057304, filed Mar. 19, 2013, which is hereby incorporated by reference herein in its entirety.

What is claimed is:

1. An information processing apparatus having a screen that accepts multi-touch instructions, the information processing apparatus comprising:
a CPU; and
a memory storing a program that, when executed by the CPU, controls the information processing apparatus to:
displaying a document including an object on the screen;
perform a move operation when an instruction for a drop operation of the object is accepted at a second coordinate position after an instruction for a drag operation of the object at a first coordinate position, the move operation moving the object displayed on the screen from the first coordinate position to the second coordinate position; and
perform a change operation when a change instruction is accepted on the screen for a page change, the change operation changing a page displayed on the screen,
wherein, in the move operation, during execution of the drag operation to drag the object from a first page, when a change instruction is accepted to change a page displayed as a background of the dragged object on the screen from the first page to a second page, and then when an instruction is accepted for the drop operation to drop the object onto the second coordinate position on the second page after the change of the background page displayed on the screen to the second page, then the move operation and the change operation are performed so that the object is moved from the first coordinate position on the first page to the second coordinate position on the second page, and
wherein instructions for the drag operation and the change operation are made by different instruction members on the same screen.

2. The information processing apparatus according to claim 1, wherein, during the execution of the drag operation to drag the object from the first page, if a move instruction is accepted for a scrolling operation to scroll the first page, then the move operation is performed so that the object is arranged at a scrolled position on the first page.

3. The information processing apparatus according to claim 1, wherein the program, when executed by the CPU, further controls the information processing apparatus to, if the object is at a contact position of an instruction member, and if a size of a contact region of the instruction member is determined to be larger than a size of the object, display the object on the screen to be larger than the contact region during dragging of the object.

4. The information processing apparatus according to claim 1, wherein the different instruction members are different fingers of a user.

5. A control method of an information processing apparatus having a screen that accepts multi-touch instructions, the method comprising steps of:
displaying a document including an object on the screen;
moving the object displayed on the screen from a first coordinate position to a second coordinate position when an instruction for a drop operation of the object is accepted at the second coordinate position after an instruction for a drag operation of the object at the first coordinate position; and
changing a page displayed on the screen, when a change instruction is accepted on the screen for a page change,
wherein, during execution of the drag operation to drag the object from a first page, when a change instruction is accepted to change a page displayed as a background of the dragged object on the screen from the first page to a second page, and then when an instruction is accepted for the drop operation to drop the object onto the second coordinate position on the second page after the change of the background page displayed on the screen to the second page, then the object is moved from the first coordinate position on the first page to the second coordinate position on the second page, and
wherein instructions for the drag operation and the change operation are made by different instruction members on the same screen.

6. The method according to claim 5, wherein, during the execution of the drag operation to drag the object from the first page, if a move instruction is accepted for a scrolling operation to scroll the first page, then the object is arranged at a scrolled position on the first page.

7. The method according to claim 5, further comprising a step of, if the object is at a contact position of an instruction member, and if a size of a contact region of the instruction member is determined to be larger than a size of the object, displaying the object on the screen to be larger than the contact region during dragging of the object.

8. The method according to claim 5, wherein the different instruction members are different fingers of a user.

9. A non-transitory computer-readable storage medium storing a program that, when executed by a CPU of an apparatus having a screen that accepts multi-touch instruction, controls the apparatus to perform a method comprising she steps of:

displaying a document including an object on the screen;
moving the object displayed on the screen from a first coordinate position to a second coordinate position when an instruction for a drop operation of the object is accepted at the second coordinate position after an instruction for a drag operation of the object at the first coordinate position; and
changing a page displayed on the screen, when a change instruction is accepted on the screen for a page change,
wherein, during execution of the drag operation to drag the object from a first page, when a change instruction is accepted to change a page displayed as a background of the dragged object on the screen from the first page to a second page, and then when an instruction is accepted for the drop operation to drop the object onto the second coordinate position on the second page after the change of the background page displayed on the screen to the second page, then the object is moved from the first coordinate position on the first page to the second coordinate position on the second page, and
wherein instructions for the drag operation and the change operation are made by different instruction members on the same screen.

\* \* \* \* \*